3,164,190
SCREW WITH LOCKNUT
Romulo de Cruylles Peratallada, Rambla Cataluna 66, Barcelona, Spain
Filed July 31, 1962, Ser. No. 213,778
1 Claim. (Cl. 151—8)

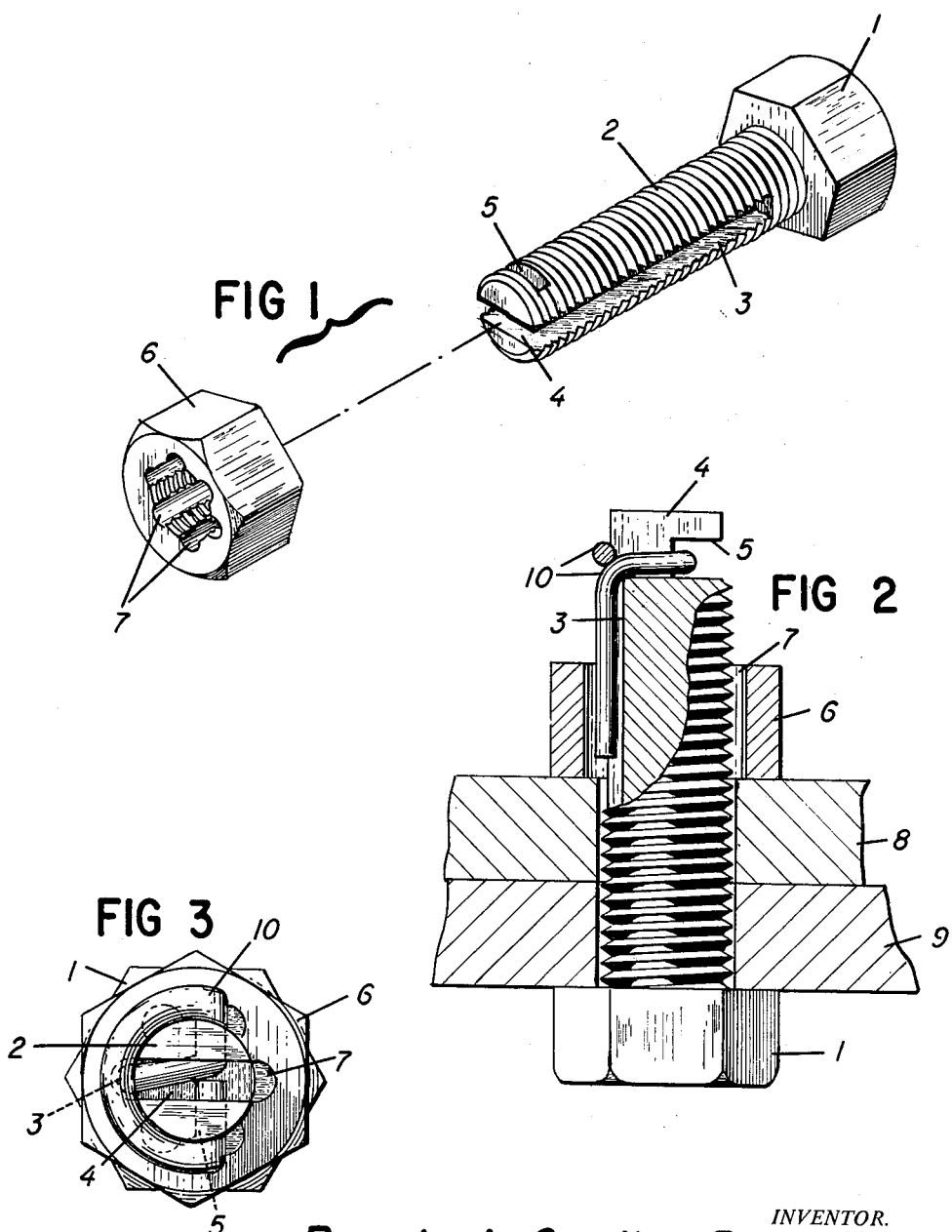

My invention relates to an improved screw or bolt with a lock- or non-loosening nut, which gives an increased safety.

In a known type of screw with lock- or non-loosening nut, the body of the screw has a longitudinal slot and the nut bears in its internal surface a plurality of slots whose sections are complementary of the slot of the screw, so that when the nut is screwed, one of the slots of the nut comes into alignment with the slot of the body, thus forming a key-way into which a key in the form of a wire is inserted to prevent relative gyratory movement between the screw and the nut.

The body of the above mentioned screw is provided also with a hole drilled along its diameter, one extremity of the hole beginning at the end of the longitudinal slot mentioned above, through which hole the free end of the key or wire protruding from the key-way slot is inserted to prevent its accidental detachment and loss.

The present invention constitutes an improvement on the foregoing type of screw with locknut by overcoming the difficulty of threading the free end of the retention key-wire through the hole, in that in the screw with locknut according to the present invention, instead of said hole, an open notch is cut along the diameter of the body of the screw at its extremity, into which notch the key-wire is easily bent and folded.

In addition to this open diametrical notch in the end of the body of the screw, another notch is formed transversely near the same end of the body between two threads and communicating with said diametrical notch.

The accidental detachment of the key-wire is avoided by bending the free end thereof and folding it into the diametrical notch, then bending it laterally through the transverse notch, passing it between two threads and bending it again into the transverse notch to firmly secure same, although this last operation is not really necessary.

A practical realization of this invention is given in the accompanying drawing showing a non-limitative example of the invention, in which FIGURE 1 is a perspective view of the screw and locknut;

FIGURE 2 represents in partial cross section one practical example where the screw and locknut hold two elements together, and FIGURE 3 is a plan view, showing the screw and the nut rendered immovable the one to the other.

The screw, whose head 1 may be of any form, is characterised by a longitudinal slot 3 cut in the body 2, the slot being preferably semi-circular in section and continued in the form of an open diametrical notch 4 cut in the end of the body 2, near which end another transverse notch is cut between two of the threads constituting the threaded portion of the body.

The nut 6 pertaining to the screw has interiorly at least one slot 7, but preferably a plurality of slots, whose form is complementary to that of the slot 3 in the body of the screw, the slot or slots in the nut, may be cut, if desired coinciding radially with the vertices formed by the flats so as not to weaken the nut mechanically.

When the nut 6 is screwed on to the screw body 2 with the object of securing elements such as 8 and 9 between the head of the screw 1 and said nut 6, the slot 3 in the body of the screw may be made to coincide with any one of the slots 7 of the nut 6, thus forming a circular conduit appropriate for the reception of a key-wire 10 which will prevent the nut 6 from turning on the body 2.

The key-wire 10 is ductile and long enough to permit its entrance into the notches 4 and 5 and folding around the body 2 of the screws, thus assuring its permanence in position in the longitudinal slot or conduit formed in the nut and the screw body. The key-wire 10 is first of all inserted in the conduit formed by the slots 3 and 7, then it is bent and folded into the diametrical notch 4 from which it is drawn laterally through 5, and then, if more security is desired, it may be wrapped around the body 2 between two threads and made to re-enter the notch 5, although this last operation is not essential.

It is understood that any modifications in form or detail may be introduced in the example given here of one form of realization of the invention, without altering the essential characteristics of this invention; for example the number of slots 7 in the nut 6, as also the number of slots 3 in the body 2 of the screw, may be changed, in order to amplify the possibilities of coincidence of the slots in the screw body and the nut by reason of the smaller angular turning necessary, thus facilitating the insertion and bending of the key-wire 10 in various manners.

I claim:

A screw bolt having a shank with threads extending to the end thereof, said shank having a longitudinal slot and a bifurcated end forming a diametrical notch in continuation of said longitudinal slot in cooperation with a nut having a plurality of longitudinal slots and a key-wire inserted in the conduit formed by the coincidence of two corresponding slots, said bolt including a transverse slot at right angles to said notch cut in the bolt at the opposite side of said bolt from said longitudinal slot and in a plane coinciding with the bottom of said diametrical notch, said transverse slot being spaced from the end of said shank and opening to the external surface of said bolt on both sides of said notch said diametrical notch dividing the end portion of the bolt over said transverse slot, the protruding portion of said key-wire being bent into said diametrical notch and then threaded through one end of said transverse slot and the free end of said key-wire being bent around said shank and across said longitudinal slot and into the opposite end of said transverse slot, preventing said key-wire from becoming accidentally detached.

References Cited by the Examiner
UNITED STATES PATENTS

| 436,380 | 9/90 | Reagan | 151—30 |
| 2,278,344 | 3/42 | Baker | 151—8 |
| 2,404,128 | 7/46 | Field | 151—8 |

EDWARD C. ALLEN, Primary Examiner.